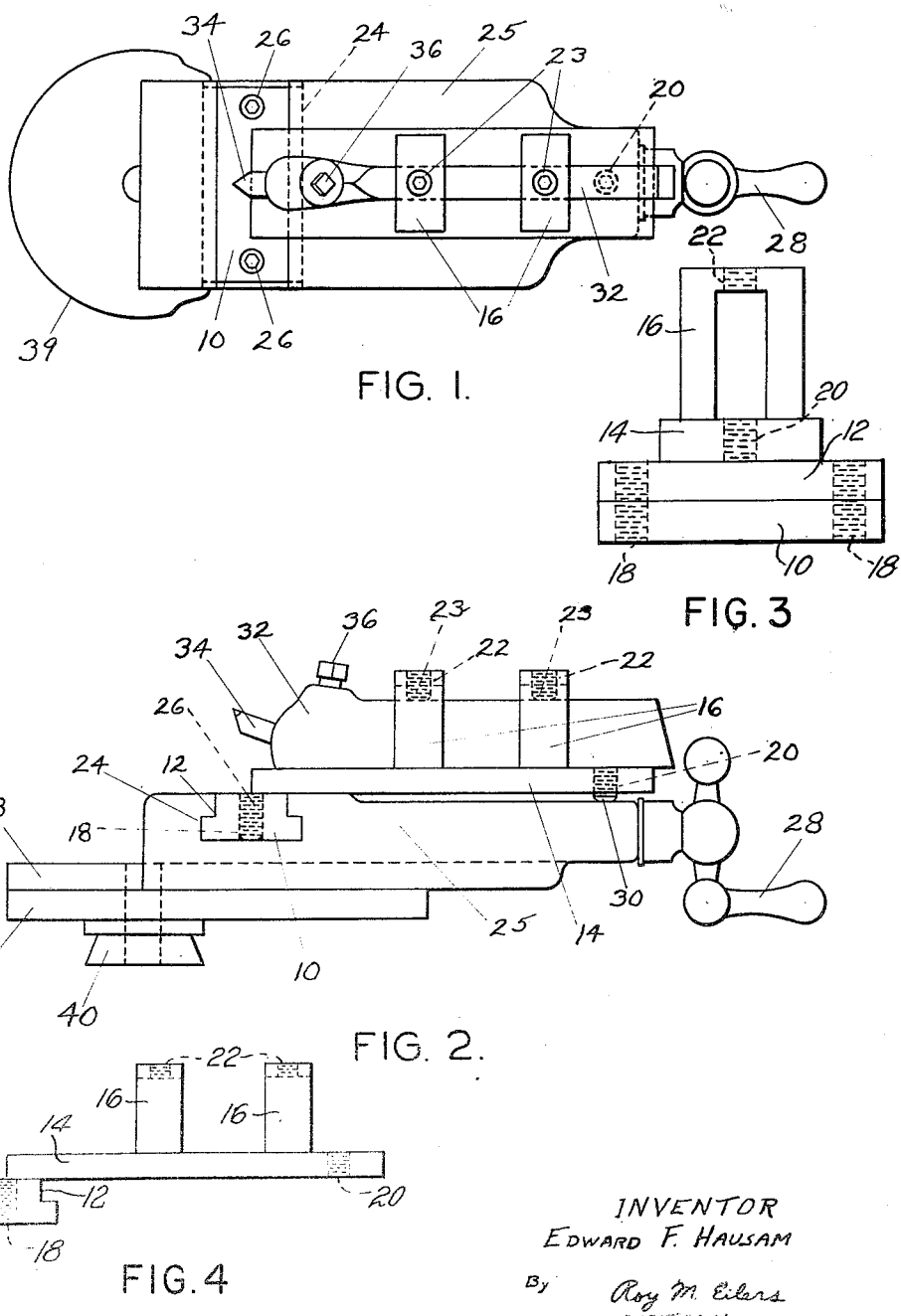

UNITED STATES PATENT OFFICE 2,529,551

MACHINE LATHE

Edward F. Hausam, Normandy, Mo.

Application July 16, 1947, Serial No. 761,311

2 Claims. (Cl. 82—37)

This invention relates to improvements in machine lathes. More particularly this invention relates to improvements in tool posts for machine lathes.

It is therefore an object of the present invention to provide an improved tool post for machine lathes.

In the operation and use of a machine lathe, it is customary to select a tool holder, insert a tool or bit in that tool holder, and then insert the tool holder in the tool post carried by the cross feed or compound rest of the lathe. Thereafter proper selection of the speed of rotation of the work piece and proper selection of the speed of the saddle of the lathe will enable the operator of the lathe to move the bit or tool against the work piece and provide that work piece with a desired configuration. The tool post in most instances is a vertically disposed cylinder that has a horizontally disposed slot adjacent the center thereof; and the tool post usually has a vertically disposed set screw in the top thereof that bears against tool holders inserted in the slot of the tool post. The slots in the tool posts can usually receive most of the standard tool holders usable with machine lathes, and those tool holders make it possible to obtain longitudinally extending or transversely extending cuts on the work piece. In some instances, where the standard tool holders are supported in a swivel compound rest and where the feed of that rest is moved conjointly with the cross feed of the lathe, the tools or bits in the standard tool holders can be used to make a limited type of arcuate cut on the work piece. Where the cut is intermediate the ends of the work piece, it must be concave; and where the cut is adjacent the end of the work piece it must be concave or it must have a large radius. As a result, it has been found largely impractical to make convex and concave cuts on work pieces by using the standard type of tool post. Instead, whenever it has been desired to form concave and convex cuts on a work piece, it has been customary to back the cross feed of the lathe away from the work piece, remove the standard tool post from the cross feed, substitute a special fixture or special tool post for the standard tool post, insert a tool holder in the special tool post, and then restore the cross feed to its original position. This is an undesirable situation because it increases the amount of time involved in performing the machining operations; and it makes it necessary to re-center the bit or tool when a change is made from a straight cut to an arcuate cut, and then to again re-center the bit or tool when a change is made from the arcuate cut to a straight cut. The present invention obviates this situation by providing a single tool post which can be used with swivel compound rests to make longitudinally extending, transversely extending, convex, and concave cuts on a piece of work in a machine lathe. It is, therefore, an object of the present invention to provide an improved tool post which can be used with swivel compound rests to provide longitudinally extending, transversely extending, convex and concave cuts for a work piece.

Various special tool posts have been proposed in the past which could be used to form concave and convex cuts on work pieces, and each of those tool posts had a pivot point intermediate its ends. The pivot points of those tool posts did permit the bits or tools to be swung in arcs, and thus they facilitated the formation of concave and convex cuts on the work pieces; but those pivot points projected into the paths of the work pieces, thus reducing the diameter of work pieces accommodated by the lathe or seriously limiting the bearing surfaces of the pivot points. Tool posts of this type can be used with many types of lathes, but they cannot operate satisfactorily with any type of lathe, since the pivot points between the stationary and rotatable elements of those tool posts must either permit "chattering" or must reduce the "throw" of the lathe. In one such tool post, a number of screws with smoothly rounded ends are carried by the rotatable member, and the rounded ends of those screws fit into a groove in the stationary member of the tool post; and the screws are intended to permit relative rotation between the stationary and rotatable members, and yet prevent shifting or "chattering" of those members. While it is possible to provide lathes with pivot points that can avoid "chattering" while permitting relative rotation between two members, such pivot points must be massive; and their massiveness prevents their incorporation in a special tool post. Consequently the prior tool posts with pivot points intermediate their ends cannot prevent "chattering" of the tool holders held by those tool posts. The present invention obviates this objection by utilizing the massive, chatter-free pivot, customarily provided between the swivel compound rest and the cross feed of the lathe, as the pivot for the tool post whenever that post swings an arc. In this way the present invention obviates the need for an additional pivot which might decrease the "throw" of the lathe, or might permit "chattering." Moreover, by using that pivot, the present invention makes it possible to use one tool post in making straight, convex, and concave cuts. It is therefore an object of the present invention to provide a tool post which can be used with the swivel compound rest of a lathe to make longitudinally extending, transversely extending, convex, and concave cuts.

In a tool post that has a pivot point intermediate its ends, the horizontal portion of the post must extend over and beyond the pivot point of the post. Where the tool post is to form a convex surface on the work piece, the cutting edge of the tool or bit must be to the rear of the center of rotation of the tool post. This means that where a tool post of this type is to make a convex cut, the horizontal portion of the tool post must extend under the work piece; and the structural and dimensional limitations of such a tool post require the horizontal portion of the tool post to be at least a quarter of an inch thick. Such a dimensioning of the horizontal portion of the tool post forces a decrease of one-half inch in the diameter of the work pieces insertable in the lathe. The present invention obviates this decrease in capacity by providing a tool post which is rigid and which relies upon the pivot between the swivel compound rest and the cross feed of the lathe to permit arcuate movement of the tool or bit. It is therefore an object of the present invention to provide a rigid tool post which can be used with the swivel compound rest of a lathe to make straight, convex and concave cuts.

In the operation and use of tool posts in lathes, it is of the utmost importance that tilting or "chattering" of the tool holders and tools and bits be eliminated. This is rather difficult since the rotative forces of the work piece are applied directly to the bit or tool, and those forces will shift or tilt that tool if it is not held rigidly. The present invention provides a tool post which can resist the rotative forces of the work piece; and that tool post has three spaced screws which bear against the swivel compound rest of the lathe and hold the tool post rigidly against movement.

By using the pivot for the swivel compound rest of the lathe as the turning point for the tool post whenever concave or convex surfaces are to be formed on the work piece, the present invention is able to utilize the cross feed of the compound rest in increasing or decreasing the radius of the cut. This cannot be done where the tool post contains a pivot point intermediate its ends, since that pivot point would move when the cross feed of the compound rest would move. Instead of changing the radius of the cut, movement of the compound rest would merely change the point of application of the tool or bit to the work piece. By enabling the compound rest to vary the radius of cut, the present invention greatly increases the versatility of lathes equipped with the tool post of the present invention. It is therefore an object of the present invention to provide a tool post which can be used with a swivel compound rest in such a way that the cross feed of the compound rest can be used to increase and decrease the radius of cut.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purposes of illustration only and do not limit the invention and that the invention will be defined by the appended claims.

In the drawing, Fig. 1 is a plan view of the tool post of the present invention as that tool post is assembled with the swivel compound rest of a machine lathe, Fig. 2 is a side elevational view of the tool post and compound rest of Fig. 1, Fig. 3 is an end elevational view of the tool post of Figs. 1 and 2, and Fig. 4 is a side elevational view of the tool post of Fig. 3.

Referring to the drawing in detail the numeral 10 denotes the foot of a tool post which is made in accordance with the principles and teachings of the present invention. The foot 10 of the tool post has two oppositely disposed shoulders 12 which enable the foot 10 of the tool post to fit into the T-slot of a swivel compound rest used with machine lathes. The foot 10 may be made as a unit or it may be made of two or more pieces of metal which are suitably held together, as by welding or other means. A horizontally disposed base 14 is secured to the foot 10, and that base extends to one side of the foot 10. The base 14 is preferably set as far to one side of the foot 10 as is possible; and the only limitation being the need of having a part of base 14 overlying the foot 10 so the base 14 can be rigidly secured to the foot 10. The base 14 and the foot 10 may be integrated in any suitable manner from two or more pieces of metal, as by welding or other suitable means; or the foot 10 and the base 14 may be formed as one piece, as by casting, forging or other means. Two guide ways 16 are provided on the top surface of the base 14; and those guide ways may be formed integrally with the base 14, as by casting, forging or other means, or they may be formed separately and then secured to the base 14, as by welding or other suitable means. The guide ways 16 are U-shaped in form, and each of them is inverted so the closed end of the U is at the top. The guide ways 16 form a slot which can receive tool holders of rectangular cross section; such tool holders being standard and customary in the machine tool art.

Threaded openings 18 are formed in the foot 10, and those openings are located adjacent the opposite ends of the foot 10. Set screws 26 can be threaded into and through the openings 18 in the foot 10, and those screws can be brought to bear against the bottom surface of the T-slot 24 in the swivel compound rest of a lathe. When seated in this manner, the set screws 26 will force the shoulders 12 of foot 10 upwardly into intimate engagement with the inwardly projecting edges of T-slot 24, thus holding the foot 10 solidly in position. A threaded opening 20 is provided at the far right end of the base 14, and that opening receives a set screw 30. When the set screw 30, in the threaded opening 20, is rotated downwardly into intimate engagement with the compound rest, that screw cooperates with set screws 26 to provide three widely spaced points of support which hold the tool post of the present invention solidly against movement or "chattering." A threaded opening 22 is provided in the upper portion of each of the guide ways 16, and those openings can receive set screws 23 which are rotatable downwardly into holding engagement with a tool holder held by the guide ways 16. The guide ways 16 are spaced apart, but they are aligned to maintain any tool holder inserted in the guide ways 16 in precise alignment with the tool post.

The tool post of the present invention is usable with the swivel compound rests that are customarily manufactured and supplied with most machine lathes. One such compound rest is shown in the drawing, and it has a transversely extending T-slot 24 that is formed in the compound feed 25. The T-slot 24 is formed and dimensioned to receive the foot 10 of the tool post of the present invention; and when the set screws 26 carried by the threaded openings 18 of foot 10 are seated against the bottom of T-slot 24, the tool post and the compound rest will act as one. The compound feed 25 underlies the threaded opening 20 in the right hand end of base 14; and proper rotation of the set screw 30 relative to opening 20 will seat the screw 30 against the compound feed 25. Thus the tool post and the compound feed 25 of the compound rest can be made to act as a unit and can be locked together against "chattering" or relative movement. The feed 25 of the compound rest can be moved toward and away from the work piece held by the lathe by rotating the handle 28. This handle is secured to an adjusting screw, not shown, which is customarily provided in compound rests; and rotation of the handle 28 can cause rotation of the adjusting screw and translation of the compound feed 25. The compound feed 25 will be guided by the inclined shoulders 38 on the base 39 of the compound rest; and it will be held against "chattering" by the shoulders 38 and by the adjusting screw of the compound rest. The base 39 of the compound rest carries a frusto-conical pivot 40, and that pivot seats in the cross feed of the lathe. The pivot 40 can be permitted to rotate relative to the cross feed or it can be locked against rotation by a clamp customarily provided on the cross feed. From this it is apparent that the compound rest of the lathe can be locked solidly to the cross feed of the lathe or can be permitted to rotate while being against "chattering." Since the tool post is rigidly secured to the compound feed 25, movement of the cross feed, as by rotation of handle 28, movement of the saddle, or swinging of the compound rest will cause appropriate movement of the tool post.

The guide ways 16 can receive and hold any of the standard tool holders customarily used in the machine tool art. A straight tool holder 32 is shown in the drawing, but the guide ways 16 can receive and hold left offset tool holders, right offset tool holders, tool holders for knurling tools, tool holders for threading tools, tool holders for cut off tools, and many other tool holders. The straight tool holder 32 carries a bit or tool 34, and that bit or tool is held against displacement by means of the set screw 36. The bit or tool 34 can be replaced and the tool holder 32 can be replaced without disturbing the tool post of the present invention. This is a considerable advantage, because once the tool post has been secured to the feed 25 of the compound rest, that tool post need not be changed; even where the lathe is used to make both straight and arcuate cuts. To make straight cuts, the clamp on the cross feed of the lathe is actuated to lock the pivot 40 against rotation, and the saddle is moved axially or radially of the work piece. To make arcuate cuts, the clamp on the cross feed of the lathe is released and the compound feed 25 is rotated. By setting the handle 28 of the compound rest so the bit or tool 34 is positioned to the left of the center of pivot 40, and by rotating the compound feed 25 about pivot 40, a concave surface can be formed on the work piece. By setting the handle 28 so the bit or tool 34 is positioned to the right of the center of pivot 40, and by rotating the compound feed 25 about pivot 40, a convex surface can be formed on the work piece. The pivot 40 can itself be moved relative to the geometric center of the work piece by moving the cross feed transversely of the lathe; and thus the point where the center of rotation of tool 34 is to be located can be varied at will.

The horizontal distance between the tool or bit 34 and the center of pivot 40 can be controlled by the setting of tool holder 32 in guide ways 16, and it can also be controlled by the setting of compound feed 25 relative to the base 39 of the compound rest. A rough setting of that horizontal distance can be obtained by proper positioning of the tool holder 32, and fine adjustment of that distance can be obtained by rotation of handle 28.

It will be noted that the tool post of the present invention does not decrease the "throw" of the lathe. The lathe is designed and dimensioned to accommodate the swivel compound rest, and the tool post of the present invention does not obstruct that portion of the compound rest which underlies the work piece. As a result, the tool post of the present invention does not decrease the "throw" of the lathe.

By having the two guide ways 16 spaced intermediate the ends of the base 14 of the tool post, the present invention provides two spaced points along the length of the tool holder 32 to hold that tool holder against shifting or tilting. Moreover, it will be noted that almost the entire lower surface of the tool holder 32 is pressed tightly against the base 14. This engagement further resists any tendency of the tool holder 32 to shift or move. In some prior tool posts which were usable in forming arcuate surfaces on the exterior of work pieces, the tool holder was supported at just one end and the rest of the tool holder acted as a cantilever beam. Such a construction is highly undesirable because bending and distortion of the tool holder cannot be prevented; and that bending and distortion can cause distortion of the surface of the work pieces. All such distortion is avoided by the tool post of the present invention.

Whereas a preferred embodiment of the present invention has been shown and described in the drawing and accompanying description, it should be obvious to those skilled in the art that various changes may be made in the form of the invention without affecting the scope thereof.

What I claim is:

1. The combination of a tool rest having an elongated T-slot and a tool post, said tool post comprising an elongated T-shaped foot dimensioned to engage the elongated T-slot in said tool rest, a base integral with said foot, said base having a front end overlying the rear part of said foot and having the front edge thereof spaced rearwardly of the front edge of said foot, a central part and a rear end, disposed wholly rearwardly of said foot, tool holding means on said base, a plurality of set screws carried in threaded openings in said foot and another set screw carried in a threaded opening in the rear end of said base, all of said set screws bearing against said tool rest, said plurality of set screws acting upon said foot and said tool rest to lock said foot in said slot of said tool rest, said other set screw acting upon said base and said tool rest to bend said base with respect to the foot and thereby create stresses within said base which are greater than stresses created in said base by the action of a work piece on a tool held in said tool holding means whereby said tool post is held rigid relative to said tool rest.

2. The combination of a tool rest having an elongated T-slot and a tool post, said tool post comprising an elongated T-shaped foot dimensioned to engage the elongated T-slot in said tool rest, a base integral with said foot, said base having a front end overlying the rear part of said foot, a central part and a rear end, disposed wholly rearwardly of said foot, tool holding means on said base, a plurality of set screws carried in threaded openings in said foot and another set screw carried in a threaded opening in the rear end of said base, all of said set screws bearing against said tool rest, said plurality of set screws acting upon said foot and said tool rest to lock said foot in said slot of said tool rest, said other set screw acting upon said base and said tool rest to bend said base with respect to the foot and thereby create stresses within said base which are greater than stresses created in said base by the action of a work piece on a tool held in said tool holding means whereby said tool post is held rigid relative to said tool rest.

EDWARD F. HAUSAM.

REFERENCES CITED

The following references are of record in the file of this patent:

UNITED STATES PATENTS

| Number | Name | Date |
|---|---|---|
| 36,111 | Sellers | Aug. 5, 1862 |
| 117,513 | Chormann | Aug. 1, 1871 |
| 2,374,477 | Feaster | Apr. 24, 1945 |